United States Patent [19]

Perrotti et al.

[11] 3,880,822

[45] Apr. 29, 1975

[54] MODIFIED POLYMER COMPOUNDS AND PROCESS FOR THE PREPARATION THEREOF

[75] Inventors: Emilio Perrotti, Milanese; Federico Maspero, Milan, both of Italy

[73] Assignee: Snam Progetti, S.p.A., Milanese, Italy

[22] Filed: Apr. 14, 1972

[21] Appl. No.: 244,022

[30] Foreign Application Priority Data
Apr. 15, 1971  Italy.................................. 23185/71

[52] U.S. Cl......... 260/94.7 N; 260/80.7; 260/80.73; 260/80.78; 260/83.3; 260/85.1; 260/86.7
[51] Int. Cl............................................. C08d 5/02
[58] Field of Search....................... 260/94.7 N, 85.1

[56] References Cited
UNITED STATES PATENTS

| | | | |
|---|---|---|---|
| 3,268,479 | 8/1966 | Martel | 260/94.7 N X |
| 3,309,373 | 3/1967 | Danzig | 260/94.7 N X |
| 3,506,636 | 4/1970 | Sturt | 260/94.7 N X |
| 3,583,961 | 6/1971 | Magay | 260/94.7 N X |
| 3,583,962 | 6/1971 | Magay | 260/94.7 N X |

*Primary Examiner*—William F. Hamrock

[57] ABSTRACT

There are provided modified polymer compounds containing nitrous, oxime or nitro-functional groups and/or bridges of the intermolecular "bis-nitrous" type or hydrogen-bonded oximes to nitro or nitrous groups. The modified polymers are prepared by reacting an ethylenically- or aromatically-unsaturated polymer with nitrogen oxide, optionally in the presence of a higher nitrogen oxide, a C-nitro-alkyl compound or a metal-containing catalyst. The modified polymer compounds are capable of coupling or cross-linking to provide higher molecular weight polymers with improved physical characteristics, yet without, loss of other desirable properties, such as crystallinity.

1 Claim, 1 Drawing Figure

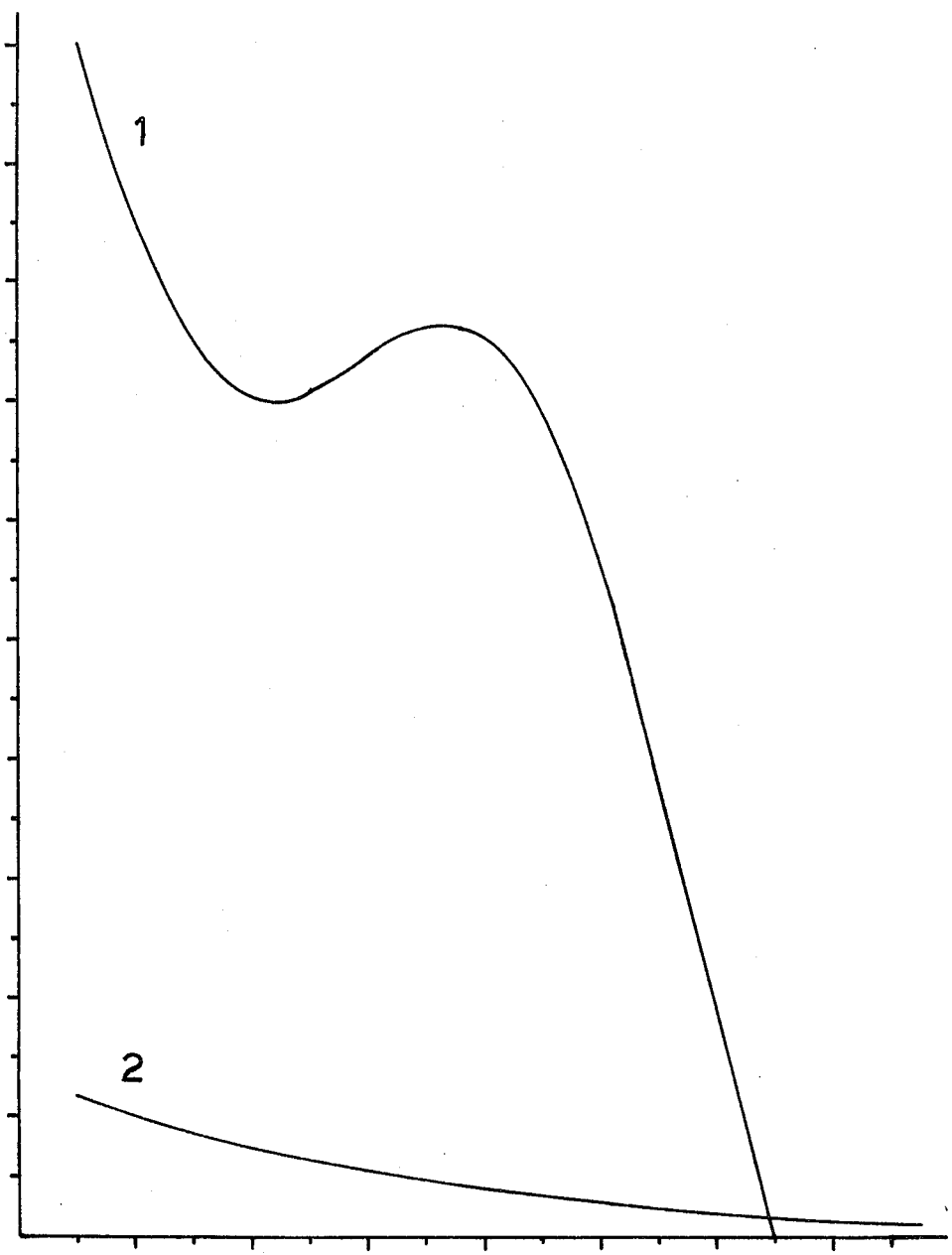

MODIFIED POLYMER COMPOUNDS AND PROCESS FOR THE PREPARATION THEREOF

The present invention relates to new modified polymer compounds and to the process for the preparation thereof.

More particularly the present invention relates to the preparation of new macromolecular compounds by binding nitrogen oxide (NO) on polymers showing ethylenic or aromatic unsaturation.

The present invention realizes a new cross-linking process of polymers which allows the resolution of peculiar problems, up to date solved by the known processes of the radical type and difficult technology, and the coupling of polymer chains having an unsaturation in the terminal position, so as to obtain new polymers having improved properties, particularly in the numerous cases in which the length of the polymer chain is directly depending on the technological properties of the polymer itself.

Furthermore the inventive process allows to carry out melt polymerizations, i.e. starting from short chain or liquid polymers and, during compounding, extrusion, straining to realize in the claimed system the polymerization of the chains themselves; in such a way it is possible to obtain polymer compounds which, at the end of the treatment, show qualities and properties directly depending on the molecular growth and on the amounts of nitrous or oxime bridges introduced.

The reactions of the low molecular weight unsaturated compounds with nitrogen oxide or dioxide are known; particularly the one consisting in reacting one olefine with a mixture of the two gases in an equal volume amount, at room pressure and temperature: the main obtained product is consistuted by a pseudonitrosite compound or a nitro-nitrous dimer.

On the contrary they do not know the reactions of same olefines with pure nitrogen oxide or nitrogen oxide containing a very low amount of nitrogen dioxide.

Furthermore they know radical quenching reactions between nitrogen oxide and unsaturated compounds, carried out in order to inhibit the polymerization or to stop the chain growth.

We have surprisingly found that the macromolecular unsaturated compounds react with nitrogen oxide to give reversible bridges of the intermolecular bis-nitrous type, or bridges constituted by hydrogen bonds between oxime groups and nitro groups.

The literature did not disclose any reference to the inventive autocatalytic process.

Without entering the reaction mechanism, the process according to the present invention consists in introducing the aforesaid bridges by employing nitrogen oxide industrially available and purified by sulphuric acid plants. The treatment or the insertion of nitrous groups does not change the basic qualities of the polymer, particularly the ones related to the configuration thereof, as results from the unchanged crystallinity degree and transition temperature.

The inventive process allows to work, besides at light temperature and pressure conditions, also without catalysts.

Possibly the reaction kinetics may be improved by the presence of an auxiliary reagent and a catalyst, particularly in the case of continuous processes. The polymers, which may be modified by the aforesaid process to give the inventive compounds, are all the ones containing olefine or aromatic double bonds in the molecule.

A particular mention may be made of the following polymers, which are advantageously employed according to the inventive process: 1,4 cis polybutadiene; 1,4 trans polybutadiene; 1,2 polybutadiene; 1,4 cis polyisoprene, 1,4 trans polyisoprene; 1,2 polyisoprene; 3,4 polyisoprene; butadiene-acrylonitrile and butadiene-styrene copolymers; butadiene-acrylonitrile-styrene, butadiene-methyl acrylate-styrene, butadiene-methyl methacrylate-styrene, butadiene-vinyl pyridine-acrylonitrile terpolymers; styrene-methyl acrylate copolymers; ethylene-propylene-diene or polyene terpolymers as ethylene-propylene-dicyclopentadiene, ethylene-propylene-cyclooctadiene, ethylene-propylene-isopropylidenetetrahydroindene, ethylene-propylene-isopropylidendicyclopentadiene and the like.

The auxiliary reactant, which acts on the double bonds of the macromolecules together with nitrogen oxide, may be substantially constituted by nitrogen higher oxides as nitrous anhydride, nitrogen dioxide or tetroxide, nitric anhydride; instead of said nitrogen oxides it is possible to employ low amount of oxygen or oxygen containing substance as air; use may be made also of organic compounds of the C-nitro alkyl type.

As above-said the binding reaction of nitrogen oxide on macromolecules containing ethylenic or aromatic double bonds may be favoured by the employment of a catalyst, which is consisting of a transition metal compound selected among one of the following classes:

a. nitroso compounds of Fe, Co, or Ni;
b. compounds having the formula $MeX_mL_n$, wherein X is an anion selected among halide, thiocyanate, nitro, cyano, hydride and the like, L is a so-called acceptor ligand as carbonyl, phosphine, arsine, stibine, olefine, m shows the metal oxidation state, $(m + n)$ is the metal coordination number, Me is the transition metal selected among Fe, Ru, Os, Co, Rh, Ir, Ni, Pd and Pt;
c. compounds having the formula $MeX_mL_n(NO)(NO_2)$ in which the symbols have the above-said meanings.

The inventive process may be applied to polymers solutions or not aqueous dispersions, or to aqueous colloidal dispersions of same products (latex). Therefore the modification may be directly carried out on the polymer after polymerization itself without isolating it in the dry state. Then the modified polymers will be subjected to the usual precipitation and drying processes.

The process is advantageously carried out at room temperatures and pressures: an increase or a decrease of both parameters does not effect the course of the reaction itself.

The solvents utilized for carrying out the reactions of nitrogen oxide have to satisfy the following properties:
i. to be a good solvent of nitrogen oxide and polymers if the reactions are carried out in solution;
ii. to have a chemical inertia enough to the reaction conditions.

As examples it is possible to mention water, chloroform, carbon tetrachloride, toluene, cyclohexene, n-hexane, n-heptane, decaline, chlorobenzene, butyl acetate, isoamyl acetate, or the mixtures of the toluene-acetic acid or xylene-acetonitrile type.

The concentration of the dissolved polymer ranges from 1 to 15% and, when an aqueous dispersion is formed, the latex may contain from 10 to 60% of polymer.

According to the inventive process resinous or fibrons elastomers are obtained.

With respect to the unchanged polymers, the obtained products present some advantages, particularly relating to the following points:

i. improvements of the resistance against chemical solvents and agents, particularly against acids and bases;

ii. improvement of the resistance against ageing owed to the fission of functional groups on the ethylenic double bonds. In connection with the fact the $R-N=O$ group reacts with radicals to form steady nitroxide compounds

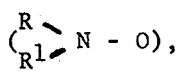

these groups act as antioxidants or stabilizers with respect to degradations caused by oxygen, light or thermic agents;

iii. improvement adhesion to textile fibers and various materials (wood, metals, glass and so on);

iv. improved compatibility with some polymers (fenoplastic, aminoplastic, polyacrilic, polyamide resins) or charges (carbon black, silica, clay and so on);

v. improvements of the modulus, the resistance and the elongation at break, besides some other mechanical properties (Green-Strength, stability to the pressing and, after pressing, an improved thermic stability against time, particularly for the polymers which have to be vulcanized.

The following examples illustrate the invention and allow to specify some experimental details.

All the percentages referred to are by weight percentages.

EXAMPLE 1

Use was made of a solution of polyisoprene (20 g) obtained according to the Italian Patent No. 778.352 in n-heptane (500 g).

It was degassed by $N_2$ and introduced into a flask.

These latter was connected with a gas-volumetric buret filled with $N_2$.

After having filled the apparatus with purified NO (passed through a KOH column), it was again and again rapidly washed by NO so as to eliminate also the gas dissolved into the solvent.

Then the solution was stirred by a blade stirrer.

After few minutes (2-3 minutes) NO began to be adsorbed. During the absorption a pressure was kept inside the vessel equal to the external one, by regulating the mercury level of the gas-volumetric buret.

When the absorption was at the wished value, the flask was rapidly degassed by $N_2$ through a plunging pipe.

The polymer was then precipitated by acetone and dried under vacuum. The best value of the absorption, corresponding to the best technological properties verified on the modified sample was comprised in the range $\Delta \nu$ gas = 0.05 + 0.15 mmoles/grams of polymer.

On the FIGURE is reported the UV absorption diagram of a polyisoprene sample treated as above-said (curve 1) obtained with respect to pure synthetic polyisoprene (curve 2).

The ordinates show the optical density, whilst the abscissae show the wave lengtht in m$\mu$ in the range 250-320 m$\mu$.

The optical density scale ranges from 0 to 1 for the synthetic polyisoprene whereas it ranges from 1 to 2 for the curve 1.

EXAMPLE 2

Use was made of a vessel connected to a membrane pump, built in such a way to recycle the gas.

The aforesaid vessel was fed by the degassed solution of polyisoprene (20 g) obtained according to the Italian Patent No. 778.352 in n-heptane (500 g) and by Rh Cl $(P \phi_3)_3$ (100 mg).

The gas buret was introduced by the wanted volume of NO.

This gas was then bubbled by recycling into the vessel.

After 20 minutes the solution was discharged through the cock set in the vessel bottom, by feeding nitrogen to the vessel top.

The polymer was then precipitated by acetone and dried. The best amount of NO ranged between 0.1 and 0.2 mmoles of NO per gram of polymer.

EXAMPLE 3

A mixer was continuously fed both by a degassed solution at 4% polyisoprene in n-heptane, proportioned by means of a proporrtioning pump, and by a costant flow of NO proportioned by means of a rotameter.

The solution was then sent to a reactor, from which it was discharged by a side pipe set in a suitable height.

The nitrogen oxide employed was the one of a bomb containing about 2% $NO_2$. By working in continuous running, good results were obtained by employing a 2 l/h flow of solution and a 150 cc/h flow of gas.

The modified polyisoprene samples were obtained by a precipitation with acetone and a drying of subsequent fractions of removed solution.

As to the chemical structure of the new polymer obtained starting from polyisoprene, it could be characterized by the physical-chemical methods (IR, UV, NMR spectrophotometry, elementary analysis, molecular weight determination) and by the suitable technological tests (Green-Strength modulus, creep, crystallinity degree, transition temperature).

Particularly it was possible to emphasize, as above-said, the presence of nitro, oxime and nitrous groups, and of steady intermolecular bridges as the bis-nitrous one or of reversible bridges as the ones caused by the hydrogen bond between an oxime group and a different group, or between two oxime group. As to the physical-chemical characterizing methods, the bis-nitrous bridge may be pointed out by the ultraviolet spectrum ($\lambda_{max}$ = 295 m$\mu$, $\epsilon$ = 10,000); the oxime group by the IR spectrum (3,600-3,500 cm$^{-1}$) and NMR (9-10 ppm); the nitro group by UV spectrum ($\lambda_{max}$ = 210 m$\mu$, $\epsilon$ = 10,000) and IR spectrum (1,580-1,560; 1,370-1,350 cm$^{-1}$). proportioning As an illustrative example, from a technological point of view the polymer was very interesting when containing about one steady bis-nitrous bridge (from 0.5 to 2) per any polymer chain.

Furthermore the product could be characterized by the technological data obtained from Green-Strength modulus (for instance a 1,000% elongation was obtained by subjecting a sample to a 4–7 kg/cm² traction; or, if the product was obtained by treating with a remarkable excess of NO, a 500% elongation was obtained at a 14–18 kg/cm² load); from the creep tests it resulted the product did not substantially change after a pressing of 5 hours; with respect to the untreated polyisoprene the following properties did not change: crystallinity properties, and the transition temperature, whilst the molecular weight encreased, it being determined by intrinsic viscosity measurements.

In connection with the peculiar characteristics required for the product, it is possible to vary the concentration of the groups and bridges of the polymer molecule fundamentally by changing the temperature and the amount of the auxiliary reactants.

In such a way it is possible to differentiate the bridge types of the polymer and to operate an optimization of the qualities according to the wanted purpose.

EXAMPLE 4

Use was made of an aqueous suspension of polyisoprene grains, as obtained from extrusion and watery washing operations.

It was introduced into a vessel and bubbled by a steam of nitrogen oxide. In order to accelerate the process, the mixture was added by an amount of $NaNO_2$ + HCl equal to 1% thereof.

After 15 minutes the polymer was washed according to the usual methods.

This example shows also the possibility of realizing the inventive process in presence of an aqueous phase, or generally of an emulsion.

What we claim is:

1. A process for the preparation of modified polyisoprene which comprises contacting a solution of polyisoprene in an inert solvent for polyisoprene and nitrogen oxide or an aqueous suspension of polyisoprene with nitrogen oxide in the presence of a $RhCl(P\phi_3)_3$ catalyst.

* * * * *